United States Patent [19]

Garcia, Jr. et al.

[11] Patent Number: 4,492,362
[45] Date of Patent: Jan. 8, 1985

[54] VALVE SEAT WITH TRAPPED O-RING

[75] Inventors: Frank Garcia, Jr., Spring; David L. Brown, Houston, both of Tex.

[73] Assignee: Vetco Offshore, Inc., Ventura, Calif.

[21] Appl. No.: 444,565

[22] Filed: Nov. 26, 1982

[51] Int. Cl.³ ............................................. F16K 3/00
[52] U.S. Cl. ................................. 251/363; 251/328; 251/360; 251/DIG. 1
[58] Field of Search ................ 251/DIG. 1, 360, 361, 251/363, 328

[56] References Cited

U.S. PATENT DOCUMENTS

| | | | |
|---|---|---|---|
| 3,083,945 | 4/1963 | Shafer | 251/363 |
| 3,566,909 | 3/1971 | Scaramucci | 251/363 |
| 3,590,837 | 7/1971 | Jeanise | 251/363 |
| 4,022,427 | 5/1977 | Read | 251/363 |

*Primary Examiner*—A. Michael Chambers
*Attorney, Agent, or Firm*—L. James Ristas

[57] ABSTRACT

A valve seat (28) having a generally saddle-shaped, eccentric surface (52); a groove (50) of constant depth and width formed in the eccentric surface, having sidewalls (70) perpendicular to the eccentric surface and a base (72) parallel to the eccentric surface; and a flexible O-ring (54) retained by friction within the groove. The groove sidewalls and base have a surface finish in the range of about 32 to 125, which provides sufficient smoothness to retain the O-ring in the required non-planar shape.

The valve seat groove (50) can be produced according to the disclosed method, which is preferably implemented in a numerically controlled four-axis horizontal milling tool system. The valve seat part (100) is mounted in a fixture (102) on a rotary table (104) such that the part axis (56) is aligned with the longitudinal axis (Z) of the tool (106). Once the initial penetration position and depth of the tool (106) is established on the eccentric surface (52a) of the part (100), the only required machine movements are table rotation (104) and tool vertical axis movement (Y).

16 Claims, 12 Drawing Figures

VALVE SEAT WITH TRAPPED O-RING

BACKGROUND OF THE INVENTION

This invention relates to valve components having a resilient sealing surface, and in particular to a valve seat having a groove or step for mounting a resilient seal.

Conventional gate valves typically include a valve body, a valve seat assembly contained within the valve body, and an actuating assembly for moving the seat assembly to control the fluid flow through the body. Commonly, the valve seat is a generally cylindrical hollow component having a surface at one end adapted to mate with a portion of the valve body. Since the seat and valve body are typically perpendicularly oriented cylinders, their "intersection" is not planar, but rather eccentric or saddle-shaped. Conventionally, a resilient material is mounted onto the saddle-shaped surface of the valve seat, to assure a tight seal against the valve body. One known technique is to machine a groove or step in the valve seat surface, then mold vulcanized rubber of approximately 90 durometer to the groove or step.

The effectiveness and longevity of the valve are usually limited by the precision and durability of the valve seat seal. In time, the rubber deteriorates and the valve must be repaired. Conventionally, such repairs require replacing the entire valve seat, since it is impossible to replace, in the field, only the molded rubber. As is well known, proper molding of the rubber onto the metal seat requires careful surface preparation and controlled time and temperature conditions which are not normally available where gate valves are frequently used, e.g., oil and gas wells.

The limitations of presently known techniques for fabricating valve seats having resilient seals, and the inability to quickly repair deteriorated seals, have resulted in high costs for manufacturing and maintaining gate valves for use in oil and gas fields. Accordingly, there exists a great and long felt need for improvements to gate valve seats that would reduce the cost of manufacture and enable users to quickly and inexpensively replace worn resilient seals.

SUMMARY OF THE INVENTION

The present invention is directed to a novel valve seat having particularly advantageous use in gate valves of the type generally used in oil field exploration and production. The invention also includes a novel method of manufacturing the valve seat.

According to the invention, the valve seat has a generally saddle-shaped, eccentric surface; a groove of constant depth and width formed in the eccentric surface, having sidewalls perpendicular to the eccentric surface and a base parallel to the eccentric surface; and a replaceable, flexible O-ring retained by friction within the groove. The groove sidewalls and base have a surface finish in the range of about 32 to 125, which provides sufficient smoothness to retain the O-ring in the required non-planar shape, yet is rough enough to be within the production capabilities of numerically controlled machine tools adapted to operate according to the inventive method.

According to the inventive method, a novel machine tool fixture and tool motion sequence enables a conventional four axis horizontal milling tool system to automatically cut the required O-ring groove perpendicular to the eccentric surface, with a groove finish in the range of about 32–125.

The method is preferably utilized in a numerically controlled system, and preferably includes the steps of arranging a four axis machine such that the axis of rotation B of the rotary work table is vertical, the X axis of the tool is horizontal, the Y axis of the tool is vertical, and the Z axis of the tool is mutually perpendicular to the X and Y axes along a line perpendicularly intersecting the B axis. The generally cylindrical valve seat part having an eccentric surface is attached to the rotary table fixture such that the axis of the seat is coincident with the Z axis of the tool. An end mill cutting tool is positioned along the X axis until the tool contacts the valve seat eccentric surface. The tool has a cutting width slightly larger than that of the undeformed O-ring. The tool motion along the Z axis is set for a constant depth of cut slightly less than the undeformed O-ring width. A geometrical relationship is established between the desired radius $R_G$ of the O-ring groove, for controlling the Y axis tool movement, and the radius $R_P$ of the eccentric surface of the valve seat part, for determining the initial rotation around the B axis to align the tool perpendicularly to the eccentric surface, and to control the Y axis incremental movement accompanying each B axis incremental rotation. Finally, the machine is provided with control instructions or program that represents the desired groove path by a series of incremental position coordinates requiring tool movement only along the Y axis in cooperation with the seat part rotation about the B axis.

The invention thus provides a valve seat having a saddle shaped groove into which a flexible O-ring can be manually installed by merely deforming and compressing the ring into the groove. The ring compression against the groove walls and base captures or traps both lateral sides of the ring without additional adhesives required.

A deteriorated ring can be easily removed from the seat without damaging the eccentric surface or groove. A new ring can be immediately installed in the groove, and it is sufficiently trapped in the groove to enable the maintanence operative to return the valve seat to the valve seat assembly without fear that the ring will "pop" out of the groove as the entire valve is reassembled.

The present invention reduces the cost of manufacturing the seat, since the rubber molding and vulcanizing is not required, and greatly simplifies the maintenance of valves in the field.

DESCRIPTION OF THE PREFERRED EMBODIMENT

Figure 1:
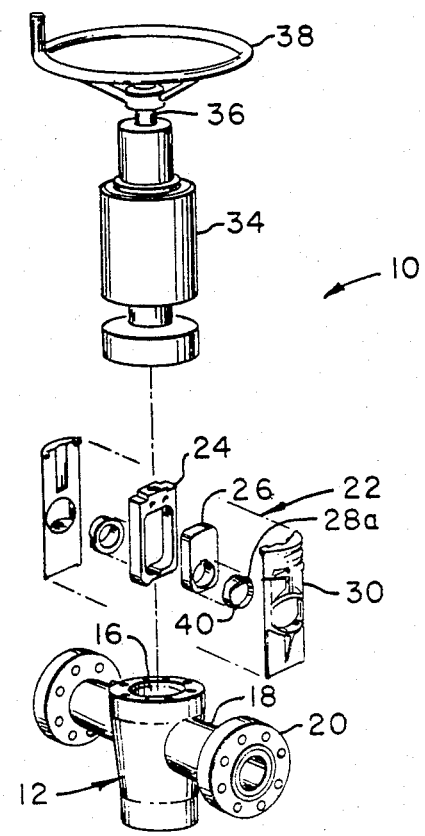
FIG. 1 is a schematic exploded view of the major parts of a known hydraulic gate valve.

FIG. 1 shows, in schematic rendition, the major functional parts of a well-known gate valve 10 of the type used, for example, in oil field exploration and production. The valve includes a body 12 defining a main bore 16, inlet and outlet nozzle 18, and flanges 20 for connecting the valve body to inlet and outlet piping (not shown). The nozzles 18 are either aligned or blocked, to permit or shut off flow, respectively, by the position of the valve seat assembly 22 within the main bore 16. As shown in an exploded view above the main bore 16, the seat assembly 22 comprises outer 24 and inner 26 gates, valve seats 28a, and valve seat carriers 30. The valve seat assembly 22 is positioned by the operator body 34, valve stem 36, and automatic or manual actuator means, such as wheel 38.

The present invention is directed to improvements in the design and machining of the valve seat 28a. Although conventional seats 28a include a resilient seal 40 molded or otherwise affixed to the seat, seal replacement or repair has been particularly costly and inefficient.

VALVE SEAT DESIGN

Figure 2:
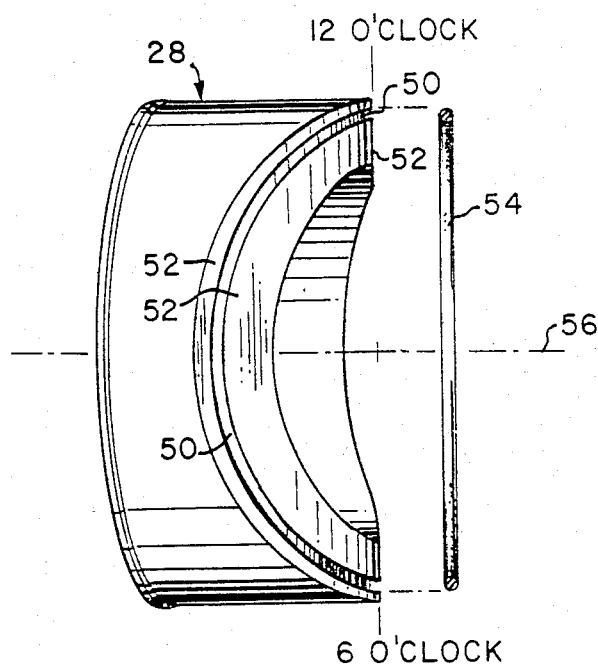
FIG. 2 is a perspective view of a valve seat according to the invention, adapted to replace the conventional cylindrical valve seat shown in FIG. 1, with a clock-face reference system superimposed thereon.

As shown in FIG. 2, the present invention provides a valve seat 28 having a machined, functional groove 50 in an oval, eccentric valve seat surface 52. The eccentric surface is saddle-shaped, since it must conform to the cylindrical curvature of the main bore hole 16 of the valve body (see FIG. 1). Essentially, the valve seat 28 and valve body 16 can be represented by the perpendicular intersection of two cylinders having different diameters. The purpose of the groove 50 is to provide a means for sealing the seat 28 with a retained elastomeric seal ring, or "O" ring 54 (shown in section before installation within the groove). The valve seat improvements disclosed herein can readily be incorporated into present valve designs, and, for example, a conventional seat 28a could be removed from an existing gate valve of the type shown in FIG. 1, and replaced with the improved seat 28 as shown in FIG. 2. Subsequent maintenance would require replacement of only the O-ring seal 54; the seat 28 could be reinserted with a new seal 54.

In FIG. 2, the improved seat 28 is shown oriented consistently with the depiction of the conventional valve seal 28a shown in FIG. 1. For convenience in understanding the ensuing description, the positions of points of interest on the eccentric surface 52 will be referred to by clock position, e.g., 12 o'clock and 6 o'clock are shown in FIG. 2 as the top and bottom positions, respectively. It may be appreciated that, if a vector were located normal to the eccentric surface 52 at the 12 o'clock position, it would be parallel to the seat axis 56. If the base of the vector were to travel along the eccentric surface, while remaining perpendicular to it, the vector would increasingly point outwardly away from the seat axis, reach a maximum outward direction at the 3 and 9 o'clock positions, then return to a parallel orientation to the seat axis at the 6 o'clock position.

According to the invention, the groove 50 is always perpendicularly oriented to the eccentric surface 52. Such groove orientation, in combination with the groove finish to be discussed more fully below, enables the O-ring 54 to be "trapped" in the groove, despite the considerable out-of-plane distortion required for the O-ring to conform to the groove contour.

Figure 4:
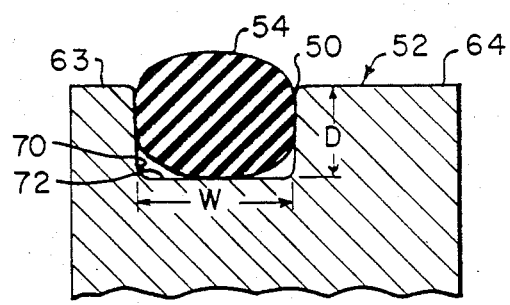
FIG. 4 is an enlarged detial view of a portion of FIG. 3, showing the groove at the 12 o'clock position.
Figure 3:
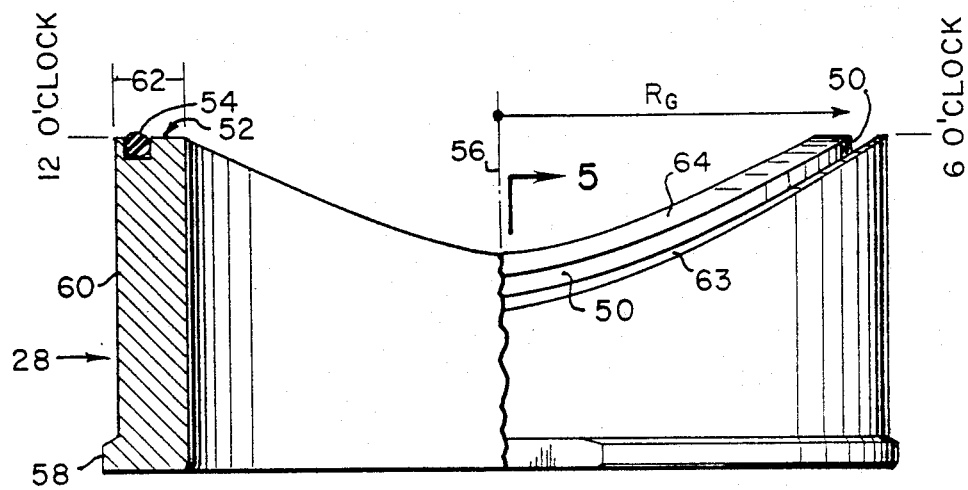
FIG. 3 is composite profile view of the valve seat shown in FIG. 2, where the portion at 12 o'clock is shown in section and the portion between 6 o'clock and 9 o'clock is shown with the resilient O-ring omitted for clarity.
Figure 5:
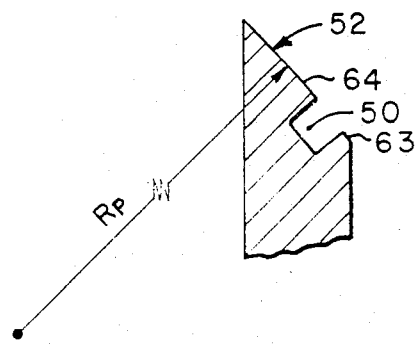
FIG. 5 is a section view taken along the line 5—5 of FIG. 3, showing the groove perpendicularly oriented to the eccentric surface at the 9 o'clock position.

Referring now to FIGS. 3, 4 and 5 additional details of the seat 28 will be set forth. The seat is oriented such that a section view is shown through the 12 o'clock position, where the eccentric surface 52 and groove 50 are parallel to the seat axis 56, and a profile view is shown between the 6 o'clock and 9 o'clock positions. The seat typically has a collar 58, a cylindrical neck portion 60 of uniform inner and outer diameters, and the saddle-shaped eccentric surface 52. The eccentric surface and saddle-shape are uniquely defined by the neck thickness 62 and the part radius $R_P$, which is equal to the nominal radius of the valve body main bore 16.

The eccentric surface 52 has a generally rectangular groove 50 machined therein, leaving an eccentric rim 63 and a secondary seal surface 64, which is a backup to the primary, resilient seal provided by the O-ring 54. In the preferred embodiment of the invention, the gate valve size (seat I.D.) is between about two to six inches. In a four inch valve, the groove 50 preferably has a depth D of 0.114 inch and a width W of 0.156 inch, to accommodate a 90 durometer viton O-ring having an undeformed diameter of 0.139 inch. Thus, the O-ring would protrude 0.025 inch above the eccentric surface 52, yet be self-retained or trapped therein. The groove radius $R_G$ is also shown on FIG. 3. A line can be drawn along the base of the groove 72, that is always a perpendicular distance $R_G$ from the seat axis 56.

The appropriately sized O-ring 54 is chosen by determining the seal diameter of the flat surface of the seat, then selecting an O-ring to fit the same approximate seal diameter. The O-ring is then stretched to fit the back diameter of the seat.

Figure 6:
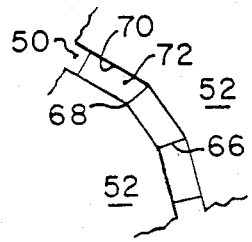
FIG. 6 is a schematic view of a groove cut into the eccentric surface, illustrating, in exaggeration, an imperfect groove finish.

As indicated above, the automatic trapping of the O-ring 54, which is typically in the range of about 80–90 durometer, is strongly dependent on the machined finished within the groove 50. FIG. 4 shows the groove inner and outer sidewalls 70 and base 72. As a practical matter, the machining of a groove such as 50 is a complex and painstaking procedure, and was not readily achievable on a production basis prior to the inventive method set forth below. Nevertheless, even with the inventive method, a perfectly smooth groove cannot be achieved. We have discovered, however, that perfection is not necessary; the O-ring can be trapped if the groove sidewall and base surfaces 70,72 are machined with a finish in the range of 32 to 125, with about 63 being quite satisfactory. As illustrated in FIG. 6 for purposes of the present disclosure, groove finish is a measure of the piece-wise linearity between adjacent "ridges" or corners 66,68 resulting from the cutting action of the tool, measured along the groove or O-ring path. In cutting the groove, the machine tool cuts a sequence of arcs or chords; the size or span of each arc is related to how closely the groove base or sidewall approaches perfection. A 32 finish means the arithmetic average of the ridge heights from the mean height, is 32 microinches.

It should also be understood that, although the sidewalls 70 are parallel to each other and perpendicular to the eccentric surface 52, a deviation in perpendicularity of up to about $2\frac{1}{2}°$ can be tolerated.

METHOD OF MACHINING THE GROOVE

The novel valve seat having a resilient seal trapped within a groove perpendicularly oriented relative to an eccentric, saddle-shaped surface, can be fabricated according to the following novel method for cutting such a groove.

Figure 7:
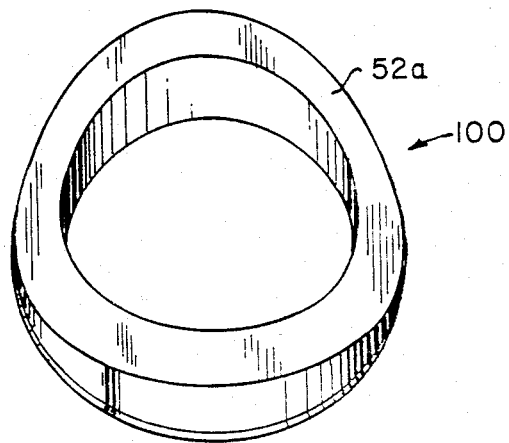
FIG. 7 is a perspective view of the valve seat part prior to the first step of the inventive method, showing the eccentric surface previously machined thereon.

FIG. 7 shows the valve seat part 100 as a conventionally machined blank, ready for further machining into a valve seat. The eccentric, saddle-shaped surface 52a is adapted to conform to the inner surface of the valve main bore 16 (see FIG. 1).

Figure 8:
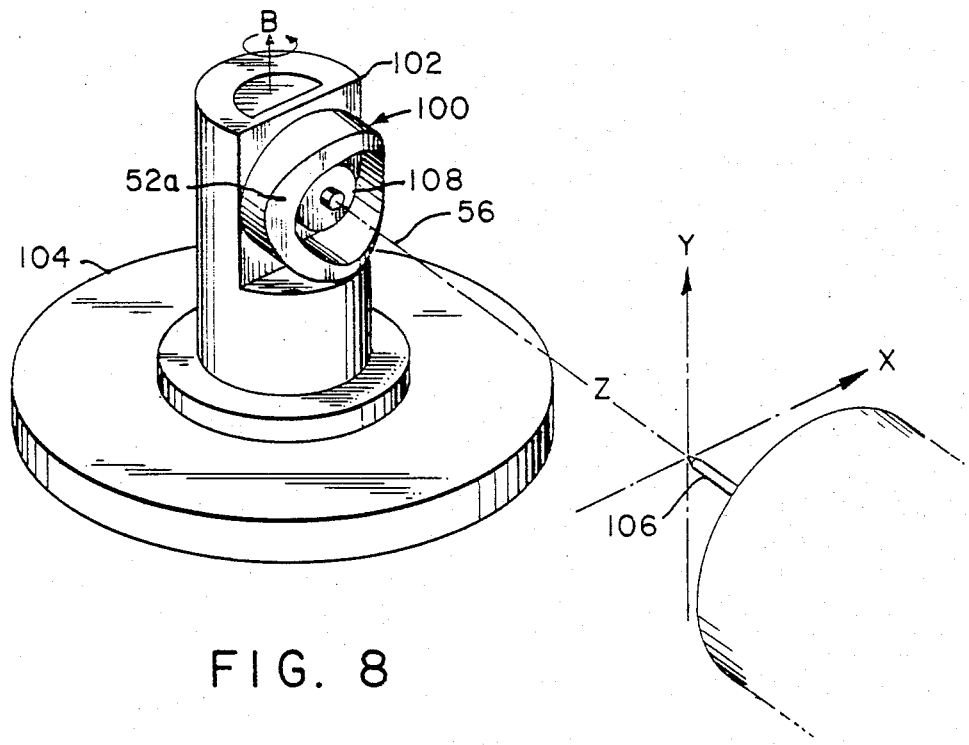
FIG. 8 is a schematic view of the valve seat part shown in FIG. 7, clamped into a fixture on a rotary table of a numerically controlled four axis horizontal milling tool system, with the table axis B and tool axes X,Y,Z, identified.

FIG. 8 shows the first step in the method, which consists of arranging a four-axis numerically controlled (N.C.) cutting tool system such that the fixture 102 is vertically oriented along the axis of rotation B of the rotary table 104, and the X (horizontal), Y (vertical), and Z (longitudinal) movement axes of the tool 106 are oriented mutually perpendicularly. Of course, other symbols or sign conventions could be used, depending on the particular N.C. machine being employed.

The fixture 102 includes means for fixedly mounting the seat part 100 perpendicularly to the B axis of rotation, along the Z axis of tool travel. A serrated expander collet 108 is shown in the figure, but other means could be used. It is important that the perpendicular distance from any point on the eccentric surface 52a of the seat part 100 to the B axis, be identical to the part radius $R_P$. Another way of describing this is that the B axis must be at the center of the radius of curvature of the eccentric surface 52a.

Having established the coordinate system with the tool origin on the axis 56 of the seat part, the N.C. machine must be controlled or programmed so the tool will traverse a path that will cut or mill the desired groove in the eccentric surface. As will be appreciated as the description proceeds, once the tool is positioned along the X axis and once the depth of cut is set on the Z axis, the tool follows a path requiring motion only along the Y axis, while the seat part turns by rotation about the B axis.

Figure 10:
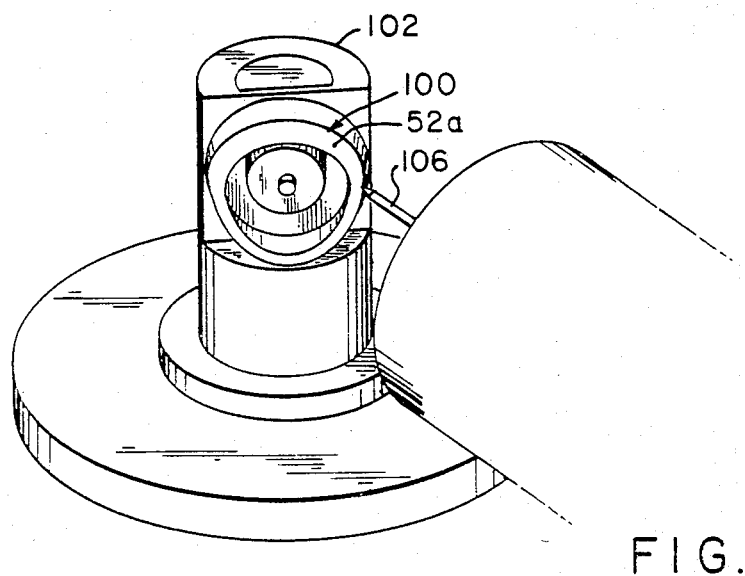
FIG. 10 is a schematic view showing the first penetration of the tool into the eccentric surface at the 3 o'clock position.

For convenience, it is desired that the tool initially penetrate the eccentric surface 52a at the 3 o'clock position, as shown in FIG. 10, and it is further desired that the tool penetrate the eccentric surface perpendicularly. The relationship between the initial Y penetration point, $Y_0$, and the initial rotary table angle $A_0$, as well as the incremental relationship, i.e., the Y axis movement required for each increment in B axis rotation, must be determined.

Figure 9:
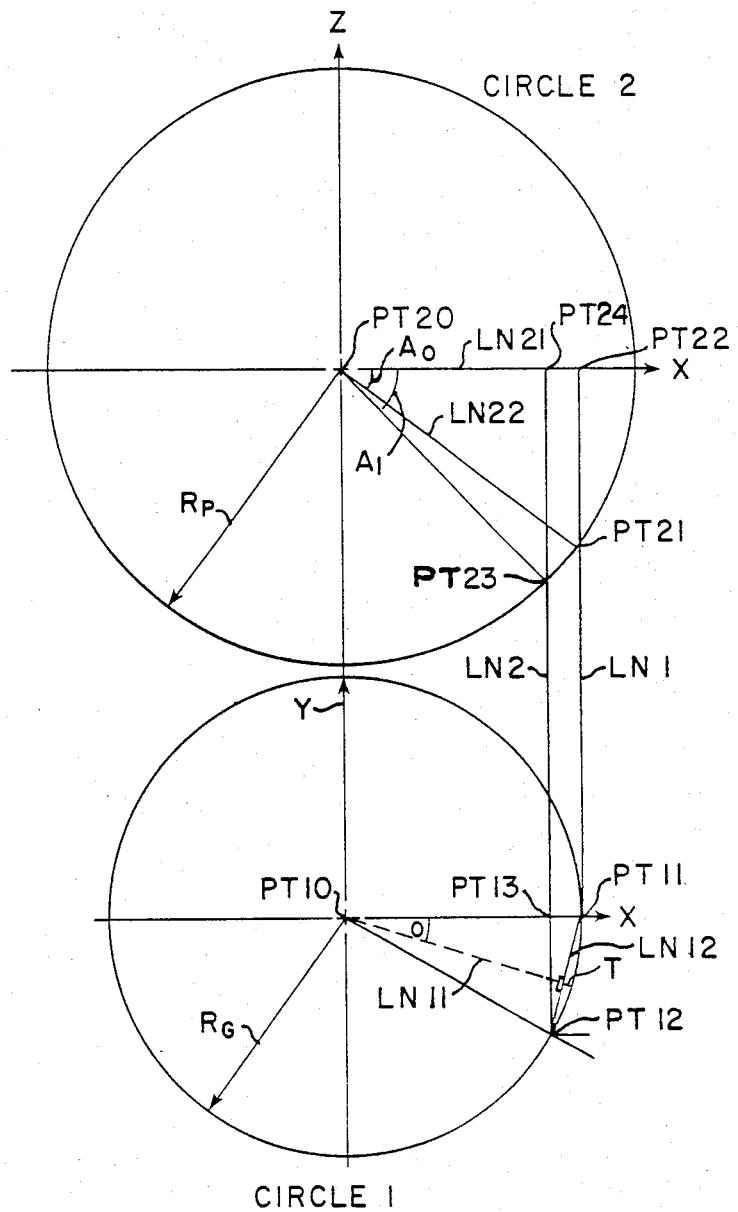
FIG. 9 is a diagram showing the typical relationship between circles defined by radii $R_P$ of the part eccentric surface and $R_G$ of the O-ring groove, whereby the Y axis tool movement can be determined for a given fixture rotation about the B axis.

Referring now to FIG. 9, the geometry of the system is shown for illustrating the derivation of the tool movement control functions input to the N.C. machine. FIG. 9 shows circle 1 (in plane X-Y), drawn with the radius $R_G$ of the groove from the centerline of the seat part, and circle 2 (in plane X-Z) having a radius $R_P$. Starting at the 3 o'clock position at radius $R_G$ of circle 1, line 1 is extended upwardly from point 11 to intersect line 21 of circle 2. (In the figure, lines and points on or within circle 1 are designated LN 10, LN 11, LN 12 . . . , and PT 10, PT 11 . . . ; lines and points on or within circle 2 are designated LN 20, LN 21 . . . , and PT 20 . . . , respectively; and lines connecting the circles are designated LN 1, LN 2 . . . ). Thus drawn, line 1 defines points 21 and 22 and lines 21 and 22. The length of line 22 is equal to $R_P$, and the length of line 21 is equal to $R_G$. Therefore, the initial table angle $A_0$ is determined through the relationship, $$\cos A_0 = \text{line 21/line 22}$$

or $$\cos A_0 = R_G/R_P$$

Having established the initial position of the tool at $Y_0 = 0$ (PT 11) and the table at $A_0 = \arccos R_G/R_P$, the path required to generate the entire groove must also be specified. As previously indicated, the tool motion will be only vertical, and the table will rotate correspondingly, or vice versa. If it is assumed that for the first cut path step the work table angle changes from $A_0$ (the initial position of tool penetration) to $A_1$, as shown on circle 2, then the necessary Y axis tool movement will be that represented by the difference in Y axis value between point 11 and point 12 on circle 1. Point 12 is determined by dropping line 2 from point 23.

As shown on circle 1, an isosceles triangle may be drawn by connecting points 10,11, and 12, with phantom line 11 drawn as the bisector. The portion of line 11 indicated by T is the tolerance of the groove from a true circle, i.e., T indicates the maximum deviation of the chord segment in plane X-Y, represented by line 12, from the true arc joining points 11 and 12 when the rotary table increment from $A_0$ to $A_1$, controls the tool Y-axis incremental motion from points 11 to 12. O is the half-angle spanned by the chord line 12. From simple trigonometry, it follows that, $$\theta = \arccos (R_G - T/R_G) \qquad \text{Equation (1)}$$

This relationship can be used to relate tolerance T, as one determinant of groove finish, to the choice of rotary angle increments $A_0, A_1, \ldots A_i, \ldots$ and Y axis movements $Y_0, Y_1, \ldots Y_i \ldots$.

The relationship between the Y axis tool movement and the B axis table rotation can now be established. The Y axis distance between points 11 and 12 is $$Y_1 = R_G \sin (2\theta) \qquad \text{Equation (2)}$$

The corresponding angular movement of the rotary table from $A_0$ to $A_1$ is $\cos A_1 = (-X_1/R_B)$, where $X_1 = [\text{point 13} - \text{point 10}]$ or $[\text{point 24} - \text{point 20}]$ $X_1 = R_G \cos (2\theta)$, then $$A_1 = \arccos [-R_G \cos (2\theta)/R_P] \qquad \text{Equation (3)}$$

To program the entire groove cutting cycle, a series of steps, each having a unique Y and B axis relationship, must be specified. If each step is designated $i = 0, 1, 2, \ldots N$, with $i = 0$ representing the initial tool and table positions at $Y_0$, $A_0$, the pair of corresponding Y and B axis coordinates are $$Y_i = R_G \sin(i*2\theta) \quad \text{Equation (4)}$$

$$A_i = \text{arc } \cos[-R_G \cos(i*2\theta)/R_P] \quad \text{Equation (5)}$$

$$\theta = \text{arc } \cos[(R_G - T)/R_G] \quad \text{Equation (1)}$$

Each $(Y_i, A_i)$ position pair is determined in sequence; the table is rotated and the tool moved continuously at depth D from coordinate to coordinate until a total of N movements, or discrete position targets, have been reached. N and $\theta$ are related such that $N = 180/\theta$. Once the choice of $\theta$ or T is made, a constant value of $\theta$ is used in equations (4) and (5). Thus, the B axis rotation $A_i$ is controlled by the Y axis movement $Y_i$, as specified by the $\theta$ increments in the X-Y plane.

In the preferred embodiment, the Y axis movement is controlled by specifying the B axis rotation increments $A_i$. The sequence of coordinates can be determined by re-writing equation (4) and (5) such that $$A_i = \text{arc } \cos(-X_i/R_P) \quad \text{Equation (6)}$$

$$Y_i = R_G \sin \theta' \quad \text{Equation (7)}$$

where $$\theta' = \text{arc } \cos(X_i/R_G) \quad \text{Equation (8)}$$

and solving equation (6) for $X_i$ for use in equations (8) and (7).

After considerable investigation, it was determined that sequential increments of about 5° in B axis rotation, i.e., $\Delta A = A_{i+1} - A_i = 5°$, would give a sufficiently smooth finish in the O-ring groove to enable the ring to be retained or trapped within the groove. For the four inch seat, the resulting groove finish was about 63. For seats having an I.D. in the range of about two to six inches, a satisfactory sequencing of B axis rotation would be in the range of about three to seven degrees. $\Delta A$ is preferably an integer satisfying $N = (180 - 2A_0)/\Delta A$. Larger values would not produce a smooth enough groove to retain the O-ring, and smaller values would be excessively time consuming.

The 5° increments in B axis rotation are translated by the computer through equations (6),(7) and (8) into the appropriate Y axis increments. These are coupled together to form a simultaneous cutting motion that generates the groove.

It should be appreciated that conventional N.C. machines are not operated according to the method set forth herein. Conventional control systems would interpret the simultaneous rotation of the B axis and vertical movement of the tool along the Y axis as a collision course and would typically turn off or in some other way fail to execute. In effect, the present invention creates a novel combination of variables for controlling the N.C. machine.

The preferred embodiment of the inventive method described above was successfully implemented on a numerically controlled K & T horizontal bore mill machine having a standard APT post processor provided by Manufacturing Data and Systems, Inc., (MDSI), with the COMPACT-2 source code, also available from MDSI. Since N.C. machines of this type have not previously been used in the described manner, it was found necessary to expand the data handling capability of the computerized controller. In particular, the X and Z axis registers of the control function within the link processor of the N.C. machine, may have to be modified to handle up to ten significant digits.

Once the N.C. machine has been setup and loaded with the program, the groove cutting operation preferably begins with a ball nose end mill to rough out the groove in accordance with equation (6),(7) and (8). Then a second pass is made with a flat bottomed end mill. As previously described, the end mill diameter of 0.156 inch cuts a groove of the same width to retain an O-ring having a 0.139 inch cross-section.

Figure 11:
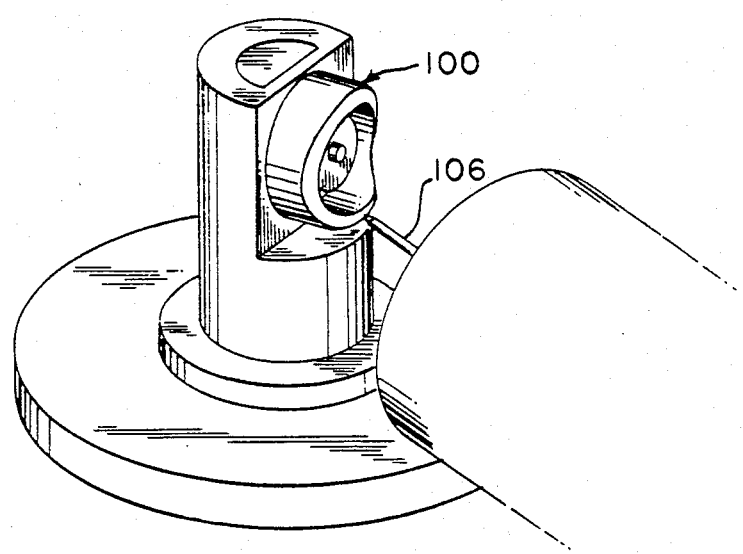
FIG. 11 is a schematic view showing the continued milling by the tool through the seat surface at the 6 o'clock position.
Figure 12:
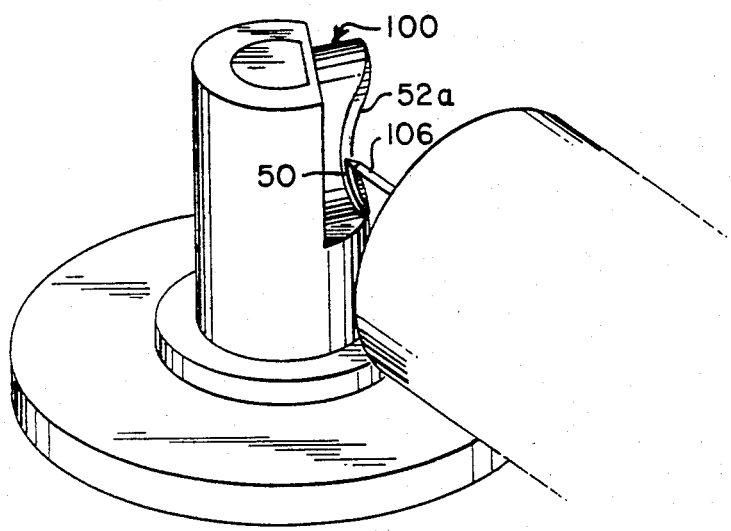
FIG. 12 is a schematic view showing the continued milling by the tool through the seat surface at the 9 o'clock position.

Referring now to FIGS. 10 through 12, a schematic representation of various stages of groove cutting according to the invention are shown. FIG. 10 shows the tool 106 first penetrating the eccentric surface 52a at the 3 o'clock position corresponding to $Y_0$ and $A_0$. As the machining progresses, the tool moves downward along the Y axis and the fixture rotates along the B axis such that the tool 106 is positioned at 6 o'clock in FIG. 11. As shown in FIG. 12, the tool 106 has now moved upward along the Y axis whereas the rotary table has continued rotating such that the tool is at the 9 o'clock position on the eccentric surface 52a. This is the position of maximum table rotation equal to $(180° - 2A_0)$. From this position the table reverses rotation, and the tool moves upward, then downward, eventually returning to the 3 o'clock position shown in FIG. 10. The Y axis tool movement covers a total distance of $4R_G$.

We claim:

1. A generally cylindrical valve seat adapted to mate transversely with the inner surface of a valve main bore, said seat comprising:
   a cylindrical neck portion of constant inner and outer diameters;
   a generally saddle-shaped mating end including a smooth eccentric surface between the inner and outer diameters, said eccentric surface contoured to conform to the inner surface of the valve main bore;
   a generally rectangular groove following the contour of the eccentric surface and having constant width and depth, said groove further having opposite, parallel sidewalls substantially perpendicular to the eccentric surface, and a base parallel to the eccentric surface;
   a flexible O-ring seal trapped within the groove by friction, said ring protruding above the eccentric surface while being compressed within the groove such that the ring contacts the opposite sidewalls and the base.

2. The valve seat of claim 1 wherein the surface finish of the groove sidewalls and base is in the range of 32-125.

3. The valve seat of claim 1 wherein the base of the groove is at a constant perpendicular distance from the axis of the cylindrical seat.

4. The valve seat of claim 3 wherein the parallel sidewalls are within about $2\frac{1}{2}°$ of perpendicularity with the eccentric surface.

5. The valve seat of claim 4 wherein the O-ring is made of a material having a durometer range between about 80 to 90.

6. The valve seat of claim 1 wherein the groove width is greater than the ring diameter and the groove depth is less than the ring diameter.

7. The valve seat of claim 6 wherein the finish on the groove sidewalls and base is in the range of about 32–125.

8. The valve seat of claim 7 wherein the groove finish is about 63.

9. The valve seat of claim 1 wherein the inner diameter of the valve seat is between about two and six inches.

10. The valve seat of claim 9 wherein the finish of the groove is between about 32 and 125.

11. The valve seat of claim 10 wherein the O-ring has a durometer range of between about 80 to 90.

12. The valve seat of claim 10 wherein the groove depth is about 0.025 inch less than the O-ring undeformed cross-section, and the groove width is about 0.017 inch greater than the O-ring undeformed cross-section.

13. The valve seat of claim 12 wherein the seat carries a viton ring having an undeformed diameter of 0.139 inch is adapted for use in a four inch gate valve.

14. A generally cylindrical valve seat member adapted to carry a flexible seal ring for transversely mating with the inner surface of a generally cylindrical valve main bore, said seat member having:
   a cylindrical neck portion of constant inner and outer diameters;
   a generally saddle-shaped mating end including a smooth eccentric surface between the inner and outer diameters, said eccentric surface contoured to conform to the inner surface of the valve main bore;
   a generally rectangular groove following the contour of the eccentric surface, and having constant width and depth, said groove further having opposite, parallel sidewalls substantially perpendicular to the eccentric surface, and a base parallel to the eccentric surface, said sidewalls and base having a surface finish in the range of about 32–125.
   whereby a flexible O-ring may be manually compressed within the groove and remain trapped therein by friction.

15. The valve seat member of claim 14 wherein the groove width is greater than the groove depth.

16. The valve seat member of claim 14 wherein the groove sidewalls are within about $2\frac{1}{2}°$ from perpendicularity to the groove base.

* * * * *